UNITED STATES PATENT OFFICE.

HEINRICH BAUM, OF FRANKFORT-ON-THE-MAIN, GERMANY.

PROCESS OF MAKING ORTHOHALOGENPHENOL.

SPECIFICATION forming part of Letters Patent No. 554,974, dated February 18, 1896.

Application filed July 6, 1894. Serial No. 516,709. (No specimens.) Patented in Belgium July 1, 1893, No. 105,361; in England July 1, 1893, No. 12,942; in France July 1, 1893, No. 231,254, and in Italy September 30, 1893, LXVII, 405.

*To all whom it may concern:*

Be it known that I, HEINRICH BAUM, a subject of the German Emperor, residing at Frankfort-on-the-Main, Germany, have invented certain new and useful Improvements in the Manufacture of Pyrocatechin and Orthohalogenphenol, (for which I have obtained Letters Patent in Belgium, No. 105,361, dated July 1, 1893; in Great Britain, No. 12,942, dated July 1, 1893; in France, No. 231,254, dated July 1, 1893, and in Italy, No. LXVII, 405, dated September 30, 1893;) and I do hereby declare the following to be a clear and exact description of the invention, such as will enable others skilled in the art to which it appertains to make and use the same.

Prior to my invention it was suggested that by conducting bromin vapors into pnenol, or that by brominating a solution of phenol in glacial acetic acid, the following bromphenols could be obtained—namely, one-fourth monobromphenol, (parabromphenol,) one-half monobromphenol, (orthobromphenol,) and that under certain conditions one-third bromphenol (metabromphenol) was apparently produced, and, finally, that the said bromphenols could be obtained pure from the bromanilins. It has also been suggested that orthobromphenol could be produced from one-half bromanilin and from one-half nitrophenol, as set forth in *Smith's Translation of Richter's Organic Chemistry*, pp. 673 and 674. In the last-named work, under "Chlorphenols," it has been shown that three chlorin compounds corresponding with the bromin compounds above referred to could be obtained in a perfectly-pure state from the corresponding chloranilins, and that by chlorinating phenol while boiling a mixture of para and ortho chlorphenol is obtained, from which these derivatives could be separated by fractional distillation, as described under chlorphenols in the work above referred to.

From the described action of chlorin upon boiling phenol it might be presumed that by substituting bromin for the chlorin a mixture of ortho and para bromphenol will be obtained, and not an orthobromphenol sufficiently pure for use in the production of pyrocatechin by treatment with an alkali. I have, however, discovered that orthobromphenol can be obtained almost exclusively and directly from phenol in such a condition as to adapt it for the production of pyrocatechin by treatment with an alkali. I may therefore state that the production of orthobromphenol directly from phenol and in a condition for use in the production of pyrocatechin was unknown prior to my invention. This technically valuable, and in the manufacture of pyrocatechin, highly-valuable product, is obtained according to my invention by the action of bromin upon heated phenol, the product of the reaction being available for the production of pyrocatechin, or it may first be purified.

I am aware that phenol has heretofore been brominated, the process being carried out in the cold, the reaction yielding chiefly a crystallizable parabromphenol, (see *Hübner and Brenker Reports of the German Chemical Society*, Vol. VI, p. 171,) the liquid orthobromphenol being, however, obtained in an impure state, and has been purified by means of orthobromanilin, yielding when melted with caustic potash a compound composed chiefly of resorcin and a small proportion of pyrocatechin. (See *Reports of the German Chemical Society*, Vol. VIII, p. 563.) Hence, as above stated, the production of orthobromphenol directly from phenol by treating heated phenol with bromin, whereby the orthobromphenol is obtained in a sufficiently-pure state to be used in the production of pyrocatechin, was not known prior to my invention, nor was it known that a sufficiently-pure orthochlorphenol could be obtained by the substitution of chlorin for the bromin, as is clearly evidenced by the works hereinbefore referred to.

It will thus be seen that the methods of obtaining orthobromphenol and orthochlorphenol heretofore resorted to did not result in a sufficient yield for technical or commercial purposes, while both compounds obtained by said methods were invariably in such an impure state as to require purification before they could be used for the production of pyrocatechin. This led me to experimenting, in order to obviate the difficulties and disadvantages referred to and to obtain better results, and I directed my efforts to the production of these compounds in a sufficiently-pure state.

I found that the treatment of phenol with bromin in the cold did not result satisfactorily, in that the yield was insufficient, so as to be of no value for technical or commercial purposes. I then discovered, contrary to the described known behavior of bromin (and of chlorin as well) relatively to phenol, that excellent results could be obtained by causing either halogen to act directly upon phenol at temperatures above the normal, orthobromphenol and orthochlorphenol in large quantities resulting from the reaction, and I further found that the temperature of the phenol need not be raised above from about 150° to 180° centigrade.

According to known methods, the reaction of chlorin upon boiling phenol results in a mixture or compound of ortho and para chlorphenol, which necessitates its treatment with a corresponding anilin halogen in order to obtain pure orthochlorphenol. It follows, in the absence of evidence to the contrary, that compounds are obtained when bromin is used instead of chlorin—namely, that the product also consists in a mixture or compound of ortho and para bromphenol, likewise requiring further treatment with a suitable anilin halogen in order to obtain pure orthobromphenol. It is evident, therefore, that there is no suggestion of my invention in the known methods.

In carrying out my invention I heat about ninety-four kilos phenol to about 150° centigrade and introduce about one hundred and sixty kilos bromin vapor, the phenol being agitated during such introduction. The vapors evolved are condensed, the condensate being returned to the reaction mixture, while the hydrobromic acid is collected.

The orthobromphenol thus obtained is quite pure, as it contains but a small proportion of by-products, and can readily be purified by binding a portion of the impure orthobromphenol to a suitable base, for which purpose the alkali bases, as soda or potash, are particularly well suited. Thus, for instance, a sufficient quantity of caustic soda, say, about ten kilos in the form of a solution or lye, can be added to the orthobromphenol obtained, so as to bind but a portion of the impure orthobromphenol, after which the latter can be obtained in a pure state by distillation by passing steam through the mixture, better results being, however, obtained by distilling in vacuo. The distillate thus obtained boils at a temperature of from about 106° to 202° centigrade, and yields pure pyrocatechin when melted with caustic soda or potash.

Having thus described my invention, what I claim as new therein, and desire to secure by Letters Patent, is—

1. The process of obtaining orthohalogens of phenol, particularly the bromin and chlorin combinations, which consists in causing the desired halogen to act upon heated phenol.

2. The process of obtaining orthohalogens of phenol, particularly the bromin and chlorin combinations, which consists in causing the desired halogen to act upon heated phenol, binding a portion of the product of the reaction by means of an alkali and separating the ortho compounds from the mixture by distillation.

In testimony whereof I have hereto signed my name in the presence of two witnesses.

HEINRICH BAUM.

Witnesses:
ALVESTO S. HOGUE,
FRANK H. MASON.